(12) United States Patent
Kurata et al.

(10) Patent No.: US 10,156,392 B2
(45) Date of Patent: Dec. 18, 2018

(54) REFRIGERATION APPARATUS

(71) Applicant: Panasonic Intellectual Property Management Co., Ltd., Osaka (JP)

(72) Inventors: Yusuke Kurata, Gumma (JP); Kazuhiko Mihara, Gumma (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 122 days.

(21) Appl. No.: 15/237,228

(22) Filed: Aug. 15, 2016

(65) Prior Publication Data

US 2017/0074569 A1    Mar. 16, 2017

(30) Foreign Application Priority Data

Sep. 11, 2015    (JP) .................................. 2015-179678

(51) Int. Cl.
*F25B 49/02*    (2006.01)
*F25B 1/10*    (2006.01)
(Continued)

(52) U.S. Cl.
CPC .............. *F25B 49/027* (2013.01); *F25B 1/10* (2013.01); *F25B 9/008* (2013.01); *F25B 40/00* (2013.01);
(Continued)

(58) Field of Classification Search
CPC .......... F25B 9/008; F25B 31/004; F25B 1/10; F25B 40/00; F25B 2600/2501; F25B 2500/26; F25B 2500/24; F25B 2700/21152; F25B 2400/16; F25B 2400/13; F25B 2400/04; F25B 2309/061; F25B 2700/21151; F25B 2500/23;
(Continued)

(56) References Cited

U.S. PATENT DOCUMENTS

2011/0113808 A1\* 5/2011 Ko .......................... F25B 1/04
62/324.3

FOREIGN PATENT DOCUMENTS

JP    H0510609 A    \*  1/1993
JP    H07-018602 B        3/1995
(Continued)

OTHER PUBLICATIONS

Satoru et al., Condensation Pressure Controller of Refrigerator, Jan. 19, 1993, JPH0510609A, Whole Document.\*

*Primary Examiner* — Larry Furdge
(74) *Attorney, Agent, or Firm* — McDermott Will & Emery LLP

(57)    ABSTRACT

Refrigeration apparatus R that includes a refrigerant circuit composed of compression section 11, gas cooler 28, electric expansion valve 39, and evaporator 41 includes: electric expansion valve 33; tank 36; split heat exchanger 29; electric expansion valve 43; electric expansion valves 47 and 71; auxiliary circuit 48, main circuit 38, and control apparatus 57, in which control apparatus 57 regulates the gas cooler outlet temperature based on outside air temperature when the outside air temperature is higher than a specified temperature, and regulates the gas cooler outlet temperature based on saturation temperature ST of saturated liquid of the refrigerant after the refrigerant flows out of compressor 11 but before flows into electric expansion valve 33, when the outside air temperature is lower than the specified temperature.

3 Claims, 8 Drawing Sheets

(51) Int. Cl.
*F25B 9/00* (2006.01)
*F25B 40/00* (2006.01)

(52) U.S. Cl.
CPC . *F25B 2309/061* (2013.01); *F25B 2341/0662* (2013.01); *F25B 2400/072* (2013.01); *F25B 2400/22* (2013.01); *F25B 2400/23* (2013.01); *F25B 2500/18* (2013.01); *F25B 2600/111* (2013.01); *F25B 2600/19* (2013.01); *F25B 2600/2501* (2013.01); *F25B 2600/2509* (2013.01); *F25B 2600/2513* (2013.01); *F25B 2700/1931* (2013.01); *F25B 2700/1933* (2013.01); *F25B 2700/2102* (2013.01); *F25B 2700/2106* (2013.01); *F25B 2700/21151* (2013.01); *F25B 2700/21152* (2013.01); *Y02B 30/743* (2013.01)

(58) Field of Classification Search
CPC ...... F25B 2700/1933; F25B 2600/2513; F25B 2400/072; F25B 2700/1931
See application file for complete search history.

(56) References Cited

FOREIGN PATENT DOCUMENTS

| | | |
|---|---|---|
| JP | 2007-178042 A | 7/2007 |
| JP | 2011-133207 A | 7/2011 |
| WO | 90/07683 A1 | 7/1990 |

* cited by examiner

REFRIGERATION APPARATUS

CROSS REFERENCE TO RELATED APPLICATIONS

This application is entitled to and claims the benefit of Japanese Patent Application No. 2015-179678, filed on Sep. 11, 2015, the disclosure of which including the specification, drawings and abstract is incorporated herein by reference in its entirety.

TECHNICAL FIELD

The present invention relates to a refrigeration apparatus that includes a refrigerant circuit composed of a compression section, a gas cooler, a main throttle section, and an evaporator.

BACKGROUND ART

Conventionally, refrigeration apparatuses include a refrigeration cycle composed of a compression section, a gas cooler, a throttle section, and the like. Refrigerant compressed in the compression section radiates heat in the gas cooler, and is then decompressed in the throttle section so that the refrigerant evaporates in the evaporator. As the refrigerant evaporates, surrounding air is cooled.

In recent years, the refrigeration apparatuses of this type have been inhibited from using chlorofluorocarbon-based refrigerant because of natural environmental issues and the like. Accordingly, refrigeration apparatuses have been developed which use carbon dioxide that is natural refrigerant as a substitute of the chlorofluorocarbon-based refrigerant. The carbon dioxide refrigerant, which is refrigerant having large difference between high and low pressures, is known to have a low critical pressure, so that the high-pressure side of a refrigerant cycle is in a supercritical state when the carbon dioxide refrigerant is compressed (see, for example, PTL 1).

Heat pump apparatuses that constitute water heaters also increasingly use the carbon dioxide refrigerant which can provide a good heating effect in the gas cooler. In some development of such heat pump apparatuses, the refrigerant that comes out of the gas cooler is expanded in two stages, and a gas-liquid separator is interposed in between expansion apparatuses so that gas can be injected into a compressor (see, for example, PTL 2).

In refrigeration apparatuses that cool the inside of a chamber using an endothermic action in an evaporator disposed in such places as showcases, the temperature of refrigerant at an outlet of a gas cooler may increase due to the reasons such as outside air temperature (heat source temperature on the gas cooler side) being high.

In this case, specific enthalpy at an inlet of the evaporator increases, so that refrigeration performance considerably deteriorates. If discharge pressure (high pressure-side pressure) of a compression section is increased to solve the problem, coefficients of performance are decreased due to increased compression power.

Accordingly, refrigeration apparatuses that implement a refrigeration cycle called a split cycle have been proposed (see, for example, PTL 3). In the split cycle, the refrigerant cooled by a gas cooler is diverged into two refrigerant flows. One of the diverged refrigerant flows is throttled with an auxiliary throttle section, and is then allowed to flow through one channel of a split heat exchanger, while the other refrigerant flow is allowed to flow through the other channel of the split heat exchanger to perform heat exchange. The other refrigerant flow is then guided into an evaporator through a main throttle section.

According to such an refrigeration apparatus, one refrigerant flow that is decompressed and expanded by the auxiliary throttle section can cool the other refrigerant flow, so that the specific enthalpy at the inlet of the evaporator can be decreased. As a result, the refrigeration performance is enhanced.

CITATION LIST

Patent Literature

PTL 1
Japanese Examined Patent Application Publication No. 7-18602
PTL 2
Japanese Patent Application Laid-Open No. 2007-178042
PTL 3
Japanese Patent Application Laid-Open No. 2011-133207

SUMMARY OF INVENTION

Technical Problem

The above-stated gas cooler includes a fan, and rotation speed of the fan is controlled so that the pressure of refrigerant discharged from the compression section reaches a target value set in accordance with outside air temperature. However, when the outside air temperature becomes high, the pressure of the refrigerant hardly decreases even with increased rotation speed of the fan.

Accordingly, it is desired to appropriately regulate the rotation speed of the fan so that the refrigeration apparatus can be operated more efficiently while increase in rotation speed of the fan can be suppressed. If increase in rotation speed of the fan can be suppressed, noise caused by rotation of the fan can also be reduced.

An object of the present invention is to provide a refrigeration apparatus capable of appropriately regulating the rotation speed of the fan so that the refrigeration apparatus can be operated more efficiently while increase in rotation speed of the fan can be suppressed.

Solution to Problem

A refrigeration apparatus according to the present invention is a refrigeration apparatus that includes a refrigerant circuit composed of a compression section, a gas cooler, a main throttle section, and an evaporator, the refrigeration apparatus including: a pressure-regulation throttle section connected to the refrigerant circuit that is on a downstream side of the gas cooler and is on an upstream side of the main throttle section; a tank connected to the refrigerant circuit that is on a downstream of the pressure-regulation throttle section and is on the upstream side of the main throttle section; a split heat exchanger provided in the refrigerant circuit that is on a downstream side of the tank and is on the upstream side of the main throttle section; a first auxiliary throttle section and a second auxiliary throttle section, the first auxiliary throttle section regulating a pressure of the refrigerant flowing out of a pipe provided in a first height of the tank, the second auxiliary throttle section regulating the pressure of the refrigerant flowing out of a pipe provided in a position lower than the first height; an auxiliary circuit that allows the refrigerant to flow through a first flow channel of the split heat exchanger and then allows the refrigerant to be sucked to a middle-pressure portion of the compression section, the refrigerant having the pressure regulated by the first auxiliary throttle section and the second auxiliary throttle section; a main circuit that allows the refrigerant flowing out of the tank to flow through a second flow channel of the split heat exchanger to exchange heat with the refrigerant flowing through the first flow channel and then allows the refrigerant to flow into the main throttle section; and a control section that regulates a gas cooler outlet temperature to be a specified target value, the gas cooler outlet temperature being a temperature of the refrigerant after the refrigerant flows out of the gas cooler but before flows into the pressure-regulation throttle section, in which the control section regulates the gas cooler outlet temperature based on outside air temperature when the outside air temperature is higher than a specified temperature, and regulates the gas cooler outlet temperature based on saturation temperature of saturated liquid of the refrigerant after the refrigerant flows out of the compression section but before flows into the pressure-regulation throttle section, when the outside air temperature is lower than the specified temperature.

Advantageous Effects of Invention

According to the present invention, it is possible to appropriately regulate the rotation speed of the fan can so that the refrigeration apparatus can be operated more efficiently while increase in rotation speed of the fan can be suppressed.

DESCRIPTION OF EMBODIMENTS

Figure 1:
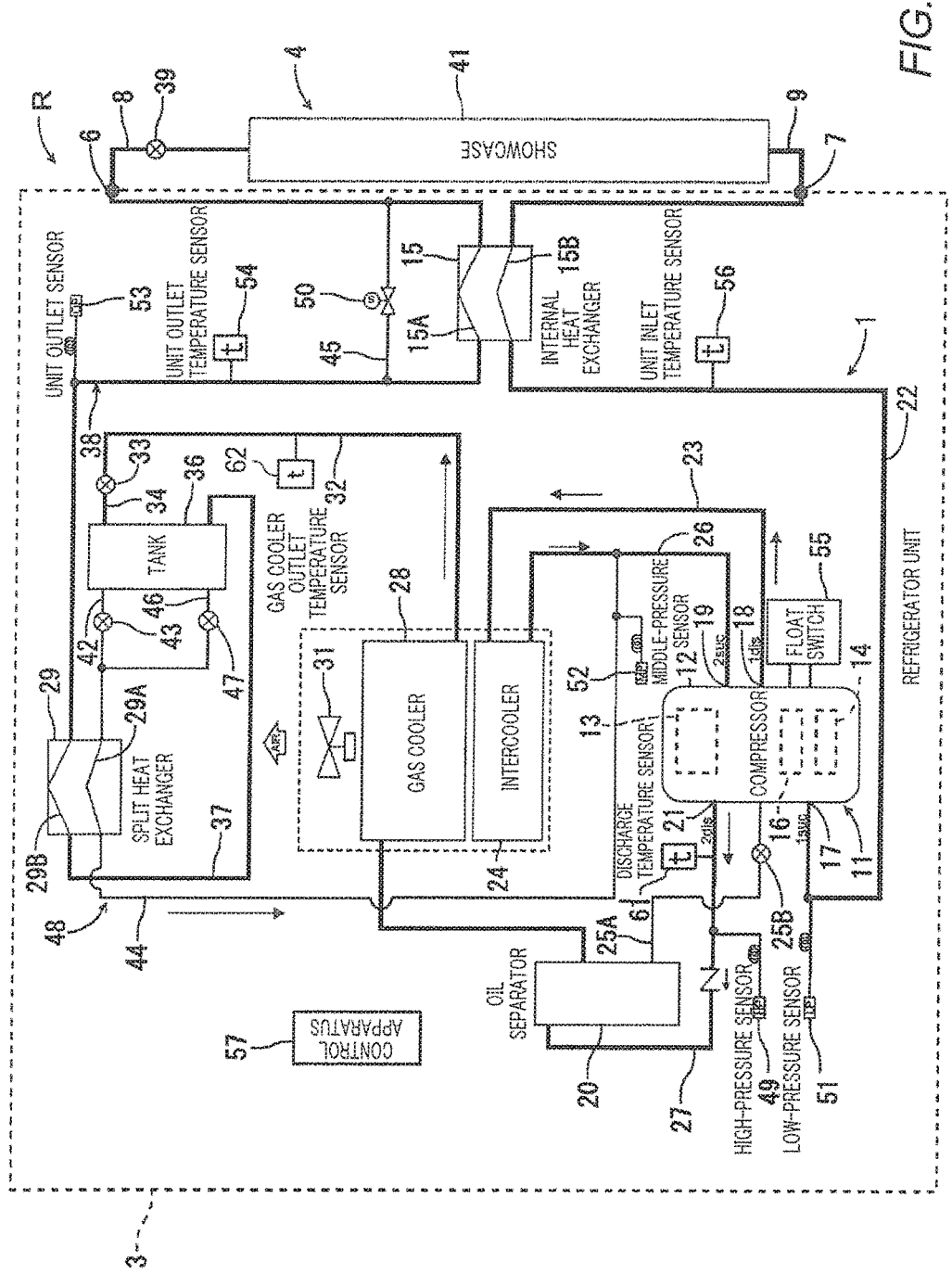
FIG. 1 illustrates a refrigerant circuit of a refrigeration apparatus in one example to which the present invention is applied.

Hereinafter, an embodiment of the present invention is described in detail with reference to the accompanying drawings.
(1) Configuration of Refrigeration Apparatus R
FIG. 1 illustrates a refrigerant circuit of refrigeration apparatus R according to one example to which the present invention is applied. Refrigeration apparatus R in the present example includes refrigerator unit 3 disposed in a place such as a machine room of a store such as a supermarket, and one or a plurality of showcases (only one showcase is illustrated in the accompanying drawing) disposed in selling space of the store. Refrigerator unit 3 and showcase or showcases 4, which are connected via refrigerant pipe (liquid pipe) 8 and refrigerant pipe 9 through unit outlet 6 and unit inlet 7, constitute specified refrigerant circuit 1.

Refrigerant circuit 1 uses carbon dioxide (R744) as refrigerant, whereby refrigerant pressure on the high-pressure side can be a critical pressure or more (supercritical). The carbon dioxide refrigerant is natural refrigerant that is friendly to the global environment and preferable in terms of inflammability, toxicity, or the like. As oil used as lubricant oil, existing oil such as mineral oil, alkylbenzene oil, ether oil, ester oil, and polyalkyl glycol (PAG), is used.

Refrigerator unit 3 includes compressor 11 that serves as a compression section. For example, compressor 11 is an internal middle-pressure two-stage compression type rotary compressor. Compressor 11 includes airtight container 12, motor element 13 that serves as a drive element housed in an upper portion of the internal space of airtight container 12, and a rotary compression mechanism section composed of first (low stage-side) rotary compression element (first compression element) 14 that is disposed on a lower side of motor element 13 and is driven with a rotating shaft of motor element 13, and second (high stage-side) rotary compression element (second compression element) 16.

First rotary compression element 14 of compressor 11 compresses low-pressure refrigerant that is sucked from the low-pressure side of refrigerant circuit 1 to compressor 11 through refrigerant pipe 9, boosts the low-pressure refrigerant to middle pressure, and discharges the middle-pressure refrigerant. Second rotary compression element 16 sucks the middle-pressure refrigerant discharged by first rotary compression element 14, compresses the middle-pressure refrigerant to high pressure, and discharges the high-pressure refrigerant to the high-pressure side of refrigerant circuit 1. Compressor 11, which is a frequency-variable compressor, changes operation frequency of motor element 13 so as to control rotation speed of first rotary compression element 14 and second rotary compression element 16.

Formed on the lateral surface of airtight container 12 of compressor 11 are low stage-side suction port 17 communicating with first rotary compression element 14, low stage-side discharge port 18 communicating with the inside of airtight container 12, high stage-side suction port 19 communicating with second rotary compression element 16, and high stage-side discharge port 21. Low stage-side suction port 17 of compressor 11 is connected to one end of refrigerant introduction pipe 22, while the other end of refrigerant introduction pipe 22 is connected to refrigerant pipe 9 at unit inlet 7. Second flow channel 15B of internal heat exchanger 15 is provided in the middle of refrigerant introduction pipe 22.

The low-pressure refrigerant gas sucked to a low-pressure portion of first rotary compression element 14 through low stage-side suction port 17 is boosted to middle pressure by first rotary compression element 14, and is discharged into airtight container 12. As a result, the pressure inside airtight container 12 reaches middle pressure (MP).

Low stage-side discharge port 18 of compressor 11, through which middle-pressure refrigerant gas in airtight container 12 is discharged, is connected to one end of middle-pressure discharge pipe 23, while the other end of middle-pressure discharge pipe 23 is connected to an inlet of intercooler 24. Intercooler 24 is configured to air-cool the middle-pressure refrigerant discharged from first rotary compression element 14. An outlet of intercooler 24 is connected to one end of middle-pressure suction pipe 26, while the other end of middle-pressure suction pipe 26 is connected to high stage-side suction port 19 of compressor 11.

The middle-pressure (MP) refrigerant gas sucked to second rotary compression element 16 through high stage-side suction port 19 is subjected to second-stage compression performed by second rotary compression element 16, so that the MP refrigerant gas is turned into high-temperature/high-pressure refrigerant gas.

High stage-side discharge port 21 provided on a high-pressure chamber-side of second rotary compression element 16 in compressor 11 is connected to one end of high-pressure discharge pipe 27, while the other end of high-pressure discharge pipe 27 is connected to an inlet of gas cooler (radiator) 28. Furthermore, oil separator 20 is provided in the middle of high-pressure discharge pipe 27. Oil separator 20 separates oil in the refrigerant discharged from compressor 11, and returns the separated oil into airtight container 12 of compressor 11 through oil passage 25A and motor valve 25B. Compressor 11 is equipped with float switch 55 that detects an oil level in compressor 11.

Gas cooler 28 is configured to cool the high-pressure discharged refrigerant discharged from compressor 11. In the vicinity of gas cooler 28, gas cooler fan 31 that air-cools gas cooler 28 is disposed. In the present embodiment, gas cooler 28 is provided side by side with intercooler 24. Gas cooler 28 and intercooler 24 are provided in the same air duct.

An outlet of gas cooler 28 is connected to one end of gas cooler outlet pipe 32, while the other end of gas cooler outlet pipe 32 is connected to an inlet of electric expansion valve 33 that serves as a pressure-regulation throttle section. Electric expansion valve 33 is configured to throttle and thereby expand the refrigerant coming out of gas cooler 28 while regulating high pressure-side pressure of refrigerant circuit 1 upstream from electric expansion valve 33. An outlet of electric expansion valve 33 is connected to an upper portion of tank 36 through tank inlet pipe 34.

Tank 36 is a volume body having space of predetermined volume therein. A lower portion of tank 36 is connected to one end of tank outlet pipe 37, while the other end of tank outlet pipe 37 is connected to refrigerant pipe 8 at unit outlet 6. Second flow channel 29B of split heat exchanger 29 is provided in the middle of tank outlet pipe 37, and first flow channel 15A of internal heat exchanger 15 is provided in the middle of tank outlet pipe 37 downstream from split heat exchanger 29. Tank outlet pipe 37 constitutes main circuit 38 in the present invention. Main circuit 38 is further connected to bypass circuit 45 in parallel with first flow channel 15A. In the middle of bypass circuit 45, solenoid valve 50 is provided as a valve apparatus.

On one hand, showcase 4 to be disposed in the store is connected to refrigerant pipes 8 and 9. Showcase 4 is equipped with electric expansion valve 39, which serves as a main throttle section, and evaporator 41. Electric expansion valve 39 and evaporator 41 are sequentially connected between refrigerant pipe 8 and refrigerant pipe 9 (electric expansion valve 39 is on the side of refrigerant pipe 8 and evaporator 41 on the side of refrigerant pipe 9). A cool air circulation fan, which is not illustrated, is provided next to evaporator 41, the cool air circulation fan sending air to evaporator 41. Refrigerant pipe 9 is connected to low stage-side suction port 17 that communicates with first rotary compression element 14 of compressor 11 through refrigerant introduction pipe 22 as stated before.

On the other hand, the upper portion of tank 36 is connected to one end of gas pipe 42, while the other end of gas pipe 42 is connected to an inlet of electric expansion valve 43 that serves as a first auxiliary circuit throttle section. Gas pipe 42 allows the gas refrigerant to flow out of the upper portion of tank 36 and to flow into electric expansion valve 43. An outlet of electric expansion valve 43 is connected to one end of middle-pressure return pipe 44, while the other end of middle-pressure return pipe 44 communicates with the middle of middle-pressure suction pipe 26 linked to a middle-pressure portion of compressor 11. First flow channel 29A of split heat exchanger 29 is provided in the middle of middle-pressure return pipe 44.

A lower portion of tank 36 is connected to one end of liquid pipe 46, while the other end of liquid pipe 46 communicates with middle-pressure return pipe 44 on the downstream side of electric expansion valve 43. Electric expansion valve 47 that serves as a second auxiliary circuit throttle section is provided in the middle of liquid pipe 46. Electric expansion valve 43 (first auxiliary circuit throttle section) and electric expansion valve 47 (second auxiliary circuit throttle section) constitute an auxiliary throttle section in this application. Liquid pipe 46 also allows the liquid refrigerant to flow out from the lower portion of tank 36 and to flow into electric expansion valve 47. Middle-pressure return pipe 44, electric expansion valves 43 and 47, and gas pipe 42 and liquid pipe 46 disposed on the upstream side of electric expansion valves 43 and 47 constitute auxiliary circuit 48 in the present invention.

Thus, electric expansion valve 33 is positioned on the downstream side of gas cooler 28 and on the upstream side of electric expansion valve 39, and tank 36 is positioned on the downstream side of electric expansion valve 33 and the upstream side of electric expansion valve 39. Furthermore, split heat exchanger 29 is positioned on the downstream side of tank 36 and on the upstream side of electric expansion valve 39. Thus, refrigerant circuit 1 of refrigeration apparatus R in the present example is constituted.

Various sensors are attached to various places of refrigerant circuit 1. For example, high-pressure discharge pipe 27 is equipped with high-pressure sensor 49. High-pressure sensor 49 detects high pressure-side pressure HP of refrigerant circuit 1 (pressure between high stage-side discharge port 21 of compressor 11 and the inlet of electric expansion valve 33 that is the pressure of the refrigerant to be discharged from compressor 11 to gas cooler 28). Gas cooler outlet pipe 32 is equipped with gas cooler outlet temperature sensor 62. Gas cooler outlet temperature sensor 62 detects a gas cooler outlet temperature that is a temperature of the refrigerant after the refrigerant flows out of gas cooler 28 but before flows into electric expansion valve 33.

Refrigerant introduction pipe 22 is equipped with low-pressure sensor 51. Low-pressure sensor 51 detects a low pressure-side pressure LP of refrigerant circuit 1 (pressure between the outlet of electric expansion valve 39 and low stage-side suction port 17). Middle-pressure suction pipe 26 is equipped with middle-pressure sensor 52. Middle-pressure sensor 52 detects a middle pressure MP that is the pressure of a middle-pressure region of refrigerant circuit 1 (pressure in middle-pressure return pipe 44 downstream from the outlets of electric expansion valves 43 and 47 that is equal to the pressure between low stage-side discharge port 18 of compressor 11 and high stage-side suction port 19).

Tank outlet pipe 37 on the downstream side of split heat exchanger 29 is equipped with unit outlet sensor 53, and unit outlet sensor 53 detects pressure TP in tank 36. The pressure in tank 36 reaches the pressure of the refrigerant that comes out of refrigerator unit 3 and flows into electric expansion valve 39 through refrigerant pipe 8. Tank outlet pipe 37 on the upstream side of internal heat exchanger 15 is equipped with unit outlet temperature sensor 54 to detect temperature IT of the refrigerant flowing into first flow channel 15A of internal heat exchanger 15. Furthermore, refrigerant introduction pipe 22 on the downstream side of internal heat exchanger 15 is equipped with unit inlet temperature sensor 56 to detect temperature OT of the refrigerant coming out of second flow channel 15B of internal heat exchanger 15. High-pressure discharge pipe 27 connected to high stage-side discharge port 21 of compressor 11 is equipped with discharge temperature sensor 61 to detect the temperature (discharge temperature) of the refrigerant to be discharged from compressor 11 to gas cooler 28.

These sensors are connected to an input of control apparatus 57 that constitutes a control section of refrigerator unit 3 composed of a microcomputer. Float switch 55 is also connected to the input of control apparatus 57. Furthermore, an output of control apparatus 57 is connected to motor element 13 of compressor 11, motor valve 25B, gas cooler fan 31, electric expansion valve (pressure-regulation throttle section) 33, electric expansion valve (first auxiliary circuit throttle section) 43, electric expansion valve (second auxiliary circuit throttle section) 47, solenoid valve 50, and electric expansion valve (main throttle section) 39. Control apparatus 57 controls these component members based on outputs of the respective sensors, setting information, and the like.

Although electric expansion valve (main throttle section) 39 and the aforementioned cool air circulation fan are also controlled by control apparatus 57 in the following description, they may be controlled by a control apparatus (not illustrated) on the side of showcase 4 that operates in cooperation with control apparatus 57 via a main control apparatus (not illustrated) of the store. Therefore, the control section in the present invention may be defined in a concept that includes control apparatus 57, the control apparatus on the side of showcase 4, the aforementioned main control apparatus, and the like.

(2) Operation of Refrigeration Apparatus R

Now the operation of refrigeration apparatus R is described. When motor element 13 of compressor 11 is driven by control apparatus 57, first rotary compression element 14 and second rotary compression element 16 rotate, so that low-pressure refrigerant gas (carbon dioxide) is sucked into the low-pressure portion of first rotary compression element 14 through low stage-side suction port 17. The low-pressure refrigerant gas is boosted to middle pressure by first rotary compression element 14, and the middle-pressure refrigerant gas is discharged into airtight container 12. As a result, the pressure in airtight container 12 reaches middle pressure (MP).

The middle-pressure refrigerant gas in airtight container 12 comes out of low stage-side discharge port 18 and enters into intercooler 24 through middle-pressure discharge pipe 23. After being air-cooled in intercooler 24, the middle-pressure refrigerant gas travels through middle-pressure suction pipe 26 and returns to high stage-side suction port 19. The middle-pressure (MP) refrigerant gas which returns to high stage-side suction port 19 is sucked into second rotary compression element 16, where second-stage compression is performed to compress the MP refrigerant gas into high-temperature/high-pressure refrigerant gas. The obtained high-temperature/high-pressure refrigerant gas is discharged into high-pressure discharge pipe 27 through high stage-side discharge port 21.

The refrigerant gas discharged to the high-pressure discharge pipe 27 flows into oil separator 20, where oil contained in the refrigerant is separated. The separated oil travels through oil passage 25A, passes through motor valve 25B, and returns into airtight container 12. Control apparatus 57 controls motor valve 25B based on the oil level in airtight container 12 detected by float switch 55 so as to regulate a return amount of oil and to thereby maintain the oil level in airtight container 12.

(2-1) Control on Electric Expansion Valve 33

Meanwhile, the refrigerant gas with the oil separated in oil separator 20 flows into gas cooler 28, and after being air-cooled in gas cooler 28, the refrigerant gas travels through gas cooler outlet pipe 32 and reaches electric expansion valve (pressure-regulation throttle section) 33. Electric expansion valve 33 is provided to control high pressure-side pressure HP in refrigerant circuit 1 upstream from electric expansion valve 33 to be specified target value THP. The valve opening of electric expansion valve 33 is controlled by control apparatus 57 based on an output of high-pressure sensor 49.

(2-1-1) Setting Opening of Electric Expansion Valve 33 at Start of Operation

At start of operation, control apparatus 57 first sets the opening (startup opening) of electric expansion valve 33 at start of refrigeration apparatus R based on the outside air temperature. Specifically, in the present embodiment, control apparatus 57 prestores a data table indicating the relation between the outside air temperature at start of operation and the opening of electric expansion valve 33 at start of operation, and sets the opening of electric expansion valve 33 at start of operation based on the outside air temperature at start of operation with reference to the data table.

The outside air temperature is detected with an outside air temperature sensor (not illustrated), for example. The outside air temperature sensor may be disposed in such places as inside or in the vicinity of an outdoor machine that houses intercooler 24, gas cooler 28, gas cooler fan 31, and the like. The outside air temperature may be detected not by the outside air temperature sensor but by control apparatus 57 based on high pressure-side pressure HP detected by high-pressure sensor 49 (this also applies to the following cases). Since high pressure-side pressure HP detected by high-pressure sensor 49 and the outside air temperature are correlated, control apparatus 57 can determine the outside air temperature based on high pressure-side pressure HP. Specifically, control apparatus 57 prestores a data table indicating the relation between high pressure-side pressure HP (outside air temperature) at start of operation and the opening of electric expansion valve 33 at start of operation, estimates the outside air temperature at start of operation, and sets the opening of electric expansion valve 33 at start of operation with reference to the data table.

(2-1-2) Setting Opening of Electric Expansion Valve 33 During Operation

During operation, control apparatus 57 sets the opening of electric expansion valve 33 based on the pressure (high pressure-side pressure HP) detected by high-pressure sensor 49 that is an index indicating outside air temperature. In this case, control apparatus 57 sets the opening of electric expansion valve 33 to be large when high pressure-side pressure HP (outside air temperature) is low. As a consequence, it is possible to minimize pressure reduction in electric expansion valve 33, and to thereby secure pressure difference between high pressure-side pressure HP and middle pressure (MP) of the refrigerant that flows through middle-pressure suction pipe 26 and flows into compressor 11, so that refrigeration operation and cold storage operation can efficiently be performed.

Here, control apparatus 57 may prestore a data table indicating the relation between high pressure-side pressure HP (outside air temperature) and the opening of electric expansion valve 33, and may set the opening of electric expansion valve 33 at start of operation by referring to the data table, or may calculate the opening from a calculation equation.

(2-1-3) Control with Upper Limit MHP of High Pressure-Side Pressure HP

When high pressure-side pressure HP upstream from electric expansion valve 33 is boosted to specified upper limit MHP due to the influence of disposition environment or a load while the control is executed as describe before, control apparatus 57 further increments the opening of electric expansion valve 33. Since increment of the opening changes high pressure-side pressure HP to be smaller, it is possible to constantly maintain high pressure-side pressure HP within upper limit MHP. As a result, abnormal rise of high pressure-side pressure HP upstream from electric expansion valve 33 can accurately be suppressed to ensure protection of compressor 11, so that forcible stop (protected operation) of compressor 11 due to abnormal high pressure can be avoided.

Here, when the refrigerant gas in a supercritical state flows out of gas cooler 28, some the refrigerant gas is expanded and liquefied while being throttled by electric expansion valve 33. The liquefied refrigerant travels through tank inlet pipe 34 and flows into tank 36 from the upper portion of tank 36, where part of the liquefied refrigerant evaporates. Tank 36 plays the role of temporarily storing and separating the liquid/gas refrigerant passing through electric expansion valve 33, and the role of absorbing pressure change in the high pressure-side pressure of refrigeration apparatus R (in a region from tank 36 to high-pressure discharge pipe 27 of compressor 11 on the upstream side of tank 36 in this case), and fluctuation in the amount of refrigerant circulation. The liquid refrigerant accumulating in the lower portion of tank 36 flows out through tank outlet pipe 37 (main circuit 38), and is cooled (supercooled) in second flow channel 29B of split heat exchanger 29 with the refrigerant flowing through first flow channel 29A (auxiliary circuit 48). Then, the liquid refrigerant is further cooled in first flow channel 15A of internal heat exchanger 15 with the refrigerant flowing through second flow channel 15B, and then comes out of refrigerator unit 3 and flows into electric expansion valve (main throttle section) 39 through refrigerant pipe 8. Operation of split heat exchanger 29 and solenoid valve 50 will be described later.

The refrigerant flowing into electric expansion valve 39 is throttled and expanded therein so that the liquid part of the refrigerant increases, and the increased liquid part flows into evaporator 41 and evaporates. This endothermic action provides a cooling effect. Control apparatus 57 controls the opening of electric expansion valve 39 based on outputs of temperature sensors, which are not illustrated, so as to regulate a degree of superheat of the refrigerant in evaporator 41 to be an appropriate value, the temperature sensors detecting the temperature on the inlet side and the outlet side of evaporator 41. The low-temperature gas refrigerant coming out of evaporator 41 returns to refrigerator unit 3 through refrigerant pipe 9, and cools the refrigerant flowing through first flow channel 15A in second flow channel 15B of internal heat exchanger 15. The low-temperature gas refrigerant then travels through refrigerant introduction pipe 22 and is sucked to low stage-side suction port 17 that communicates with first rotary compression element 14 of compressor 11. The flow of the refrigerant in main circuit 38 is as described above.

(2-2) Control on Electric Expansion Valve 43

Now, the flow of refrigerant in auxiliary circuit 48 is described. As described before, gas pipe 42 connected to the upper portion of tank 36 is connected to electric expansion valve 43 (first auxiliary circuit throttle section), and gas refrigerant flows out of the upper portion of tank 36 via electric expansion valve 43, and flows into first flow channel 29A of split heat exchanger 29.

The gas refrigerant accumulating in the upper portion of tank 36 decreases in temperature due to evaporation in tank 36. The gas refrigerant in the upper portion of tank 36 flows out through gas pipe 42 that constitutes auxiliary circuit 48 connected to the upper portion, and is throttled while passing through electric expansion valve 43. Then, the gas refrigerant flows into first flow channel 29A of split heat exchanger 29. After cooling the refrigerant passing through second flow channel 29B in first flow channel 29A, the gas refrigerant travels through middle-pressure return pipe 44, joins middle-pressure suction pipe 26, and is sucked into the middle-pressure portion of compressor 11.

Electric expansion valve 43 plays the role of regulating tank internal-pressure (pressure of refrigerant flowing into electric expansion valve 39) of tank 36 to be specified subject value SP in addition to the role of throttling the refrigerant flowing out of the upper portion of tank 36. Control apparatus 57 controls the opening of electric expansion valve 43 based on the output of unit outlet sensor 53. This is because the amount of gas refrigerant flowing out of tank 36 increases and the pressure in tank 36 decreases as the opening of electric expansion valve 43 increments.

In the present embodiment, subject value SP is set at a value lower than high pressure-side pressure HP and higher than middle pressure MP. Control apparatus 57 calculates a regulation value (number of steps) of the opening of electric expansion valve 39 based on difference between tank internal-pressure TIP (pressure of refrigerant flowing into electric expansion valve 39) of tank 36 detected by unit outlet sensor 53 and subject value SP, and adds the calculated regulation value to later-described opening at start of operation so as to control tank internal-pressure TIP (pressure of the refrigerant flowing into electric expansion valve 39) of tank 36 to be subject value SP. That is, control is executed to increment the opening of electric expansion valve 43 so that gas refrigerant inside tank 36 flows out into gas pipe 42 when tank internal-pressure TIP of tank 36 rises beyond subject value SP, whereas control is executed in the direction of closing the valve by decrementing the valve opening when pressure TIP becomes lower than subject value SP.

(2-2-1) Setting Opening of Electric Expansion Valve 43 at Start of Operation

Control apparatus 57 sets the opening (startup opening) of electric expansion valve 43 at start of refrigeration apparatus R based on outside air temperature or the pressure (high pressure-side pressure HP) detected by high-pressure sensor 49 that is an index indicating the outside air temperature. In the case of present embodiment, control apparatus 57 prestores a data table indicating the relation between the outside air temperature or high pressure-side pressure HP (outside air temperature) at start of operation and the opening of electric expansion valve 43 at start of operation.

Then, control apparatus 57 sets the opening of electric expansion valve 43 at start of operation so that the opening is incremented more as high pressure-side pressure HP (outside air temperature) is higher while the opening is decremented more as high pressure-side pressure HP is lower, based on the outside air temperature or the detected pressure (high pressure-side pressure HP) at start of operation with reference to the data table. This makes it possible to suppress increase in pressure in tank 36 at start of operation in the environment of high outside air temperature and to prevent increase in pressure of the refrigerant flowing into electric expansion valve 39.

In the present embodiment, subject value SP of tank internal-pressure TIP (pressure of refrigerant flowing into electric expansion valve 39) of tank 36 is controlled in a fixed state. However, as in the case of electric expansion valve 33, subject value SP may be set based on the outside air temperature or the pressure (high pressure-side pressure HP) detected by high-pressure sensor 49 that is an index indicating the outside air temperature. In this case, control apparatus 57 sets subject value SP to be higher as the outside air temperature or high pressure-side pressure HP is higher. Accordingly, in the environment of high outside air temperature, subject value SP of the pressure of the refrigerant flowing into electric expansion valve 39 during operation becomes high.

That is, in the situation where the pressure becomes high under the influence of high outside air temperature, middle pressure MP also becomes high, which makes it possible to prevent the inconvenience that the refrigerant hardly flows to auxiliary circuit 48 even with the opening of electric expansion valve 43 being incremented. When the opening of electric expansion valve 43 is decremented contrary to the above case, the amount of the refrigerant flowing into auxiliary circuit 48 can be decreased, which makes it possible to prevent the inconvenience that the pressure of the refrigerant at unit outlet 6 decreases. Accordingly, regardless of change in outside air temperature with the passing of the seasons, the opening of electric expansion valve 43 can appropriately be controlled, so that the change in pressure of the refrigerant at unit outlet 6 can be suppressed and the amount of refrigerant can accurately be regulated.

(2-2-2) Control with Standard Value MTIP of Tank Internal-Pressure TIP

In the case where tank internal-pressure TIP (pressure of refrigerant flowing into electric expansion valve 39) of tank 36 increases to specified standard value MTIP under the influence of disposition environment or a load while the above-stated control is executed, control apparatus 57 increments the opening of electric expansion valve 43 by specified steps. Since increment of the opening changes tank internal-pressure TIP of tank 36 to be smaller, pressure TIP can constantly be maintained within standard value MTIP, which makes it possible to ensure that influence of fluctuation in high pressure-side pressure is suppressed and that the effect of suppressing the pressure of refrigerant to be conveyed to electric expansion valve 39 is achieved.

(2-3) Control on Electric Expansion Valve 47

As described before, liquid pipe 46 connected to the lower portion of tank 36 is equipped with electric expansion valve 47 (second auxiliary circuit throttle section), so that liquid refrigerant flows out of the lower portion of tank 36 through electric expansion valve 47, joins gas refrigerant from gas pipe 42, and flows into first flow channel 29A of split heat exchanger 29.

More specifically, the liquid refrigerant accumulating in the lower portion of tank 36 flows out through liquid pipe 46, which is connected to the lower portion and constitutes auxiliary circuit 48, and is throttled while passing through electric expansion valve 47. Then, the liquid refrigerant flows into first flow channel 29A of split heat exchanger 29 and evaporates therein. The endothermic action caused by evaporation increases supercooling of the refrigerant flowing through second flow channel 29B. Then the liquid refrigerant travels through middle-pressure return pipe 44, joins middle-pressure suction pipe 26, and is sucked into the middle-pressure portion of compressor 11.

Thus, electric expansion valve 47 is configured to throttle the liquid refrigerant flowing out of the lower portion of tank 36 to cause the liquid refrigerant to evaporate in first flow channel 29A of split heat exchanger 29, so that the refrigerant of main circuit 38, which is flowing through second flow channel 29B, is supercooled. Control apparatus 57 regulates the volume of the liquid refrigerant flowing to first flow channel 29A of split heat exchanger 29 by controlling the opening of electric expansion valve 47.

Control apparatus 57 controls the opening of electric expansion valve 47 based on the temperature (discharge temperature) of the refrigerant to be discharged from compressor 11 to gas cooler 28, the temperature being detected by discharge temperature sensor 61. Hence, control apparatus 57 regulates the volume of the liquid refrigerant to be passed to first flow channel of split heat exchanger 29, and thereby controls the discharge temperature of the refrigerant, which is discharged from compressor 11 to gas cooler 28, to be specified target value TDT. That is, when an actual discharge temperature is higher than target value TDT, the opening of electric expansion valve 47 is incremented, whereas when the actual discharge temperature is lower than target value TDT, the opening is decremented. As a result, the discharge temperature of the refrigerant in compressor 11 is maintained at target value TDT to protect compressor 11.

(2-4) Control on Gas Cooler 28

Control apparatus 57 regulates the gas cooler outlet temperature based on outside air temperature, when the outside air temperature is higher than a specified temperature, and regulates the gas cooler outlet temperature based on saturation temperature ST of saturated liquid having high pressure-side pressure HP, when the outside air temperature is lower than the specified temperature. The specified temperature is, for example, a temperature smaller by a few degrees than a critical temperature of the refrigerant.

Specifically, control apparatus 57 calculates target value TT of the gas cooler outlet temperature by the following equation 1, when the outside air temperature is higher than the specified temperature:

$$TT = (\text{outside air temperature}) + a \quad \text{(Equation 1)}$$

where "a" is a specified constant.

When the gas cooler outlet temperature detected by gas cooler outlet temperature sensor 62 is larger than target value TT, control apparatus 57 increases fan rotation speed of gas cooler fan 31 to bring the gas cooler outlet temperature close to target value TT. When the gas cooler outlet temperature is smaller than target value TT, control apparatus 57 decreases the fan rotation speed of gas cooler fan 31 to bring the gas cooler outlet temperature close to target value TT.

When the outside air temperature is lower than the specified temperature, control apparatus 57 calculates target value TT of the gas cooler outlet temperature by the following equation 2:

$TT$=(saturation temperature ST of saturated liquid having high pressure-side pressure HP)+$b$ (Equation 2)

where "b" is a specified constant. In this case, control apparatus 57 may prestore a data table indicating the relation between high pressure-side pressure HP and saturation temperature ST of the saturated liquid, and set saturation temperature ST by referring to the data table, or may calculate saturation temperature ST from a calculation equation.

When the outside air temperature becomes high, high pressure-side pressure HP becomes larger than critical pressure CP of the refrigerant. In this case, control apparatus 57 regulates the gas cooler outlet temperature so as to maintain a supercritical cycle with the aforementioned equation 1. In the case where the outside air temperature becomes low and high pressure-side pressure HP becomes less than critical pressure CP of the refrigerant, control apparatus 57 regulates the gas cooler outlet temperature so as to maintain the saturation cycle with the aforementioned equation 2. Hence, control apparatus 57 can execute control suitable for each of the cases.

In conventional control, the fan rotation speed of gas cooler fan 31 is regulated to bring high pressure-side pressure HP close to the target value. When the outside air temperature is high, the conventional control may fail to decrease high pressure-side pressure HP even with the fan rotation speed being increased. However, in the control of the present embodiment, control in refrigeration operation and cold storage operation can easily be executed, so that unnecessary increase in rotation speed of the fan can be prevented and noise caused by rotation of the fan can also be decreased.

Here, control apparatus 57 determines whether or not the outside air temperature is larger than the specified temperature. This determination may be made based on the outside air temperature to be detected by the outside air temperature sensor, or may be made based on high pressure-side pressure HP detected by high-pressure sensor 49. As described in the foregoing, since the outside air temperature is correlated with high pressure-side pressure HP, control apparatus 57 can make the above determination based on high pressure-side pressure HP instead of the outside air temperature. In this case, control apparatus 57 prestores a data table indicating the relation between high pressure-side pressure HP and the outside air temperature, and estimates the outside air temperature based on high pressure-side pressure HP detected by high-pressure sensor 49 with reference to the data table.

(2-5) Operation of Refrigeration Apparatus R During Refrigeration and Cold Storage Operation at Each Outside Air Temperature Next, operation situations of refrigeration apparatus R during refrigeration and cold storage operation at each outside air temperature will be described with reference to P-H charts of FIGS. 2 to 7.

Figure 2:
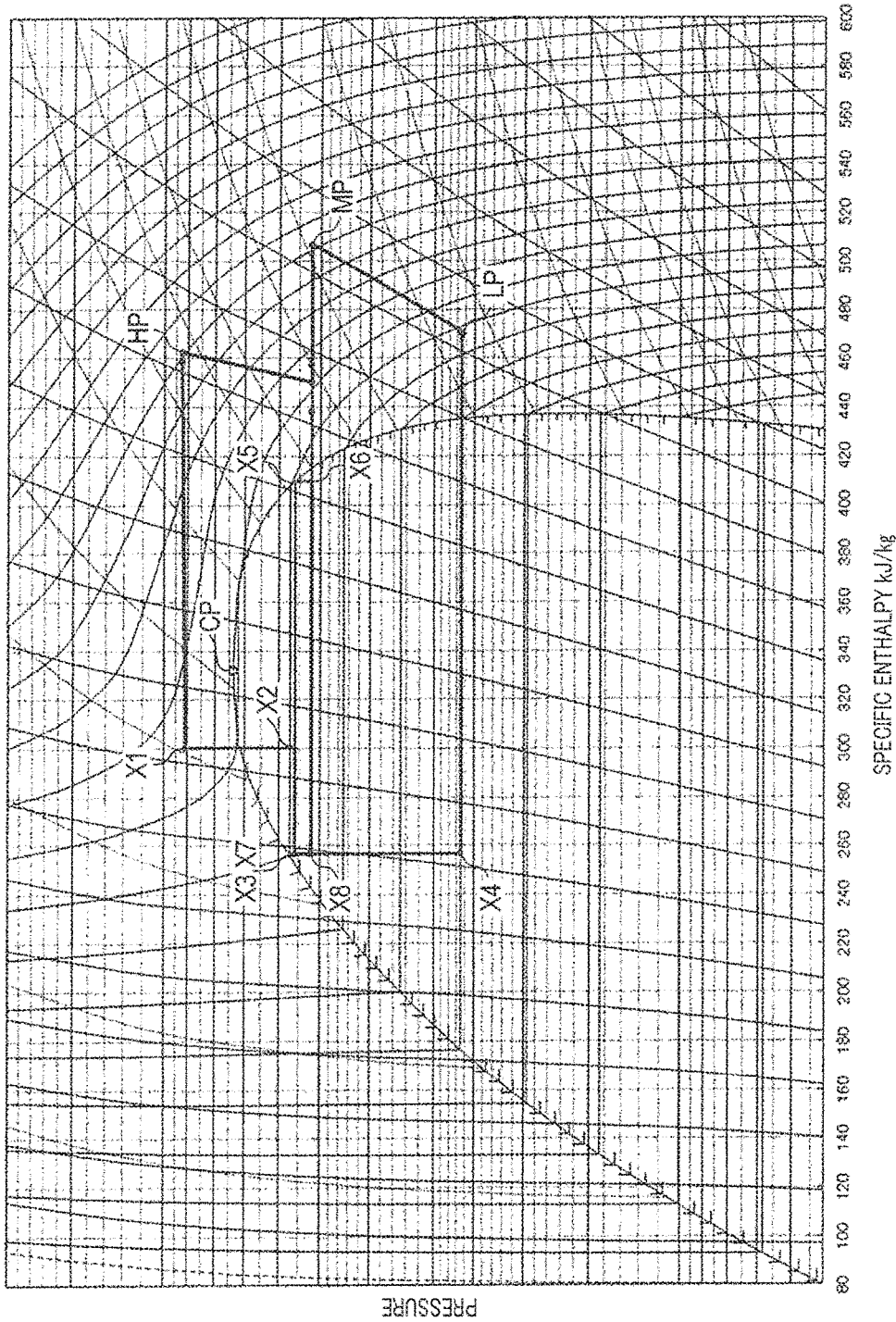
FIG. 2 is a P-H chart plotting the state of refrigeration apparatus R during cold storage operation under the environment of the high-temperature period.

FIG. 2 is a P-H chart plotting the state of refrigeration apparatus R during cold storage operation under the environment of a high-temperature period with the outside air temperature being about 32 degrees Centigrade. In FIG. 2, lines extending from X1 to X2, extending from X3 to X4, extending from X5 to X6, and extending from X7 to X8 represent pressure reduction by electric expansion valve 33, electric expansion valve 39, electric expansion valve 43, and electric expansion valve 47, respectively.

In FIG. 2, high pressure-side pressure HP becomes larger than critical pressure CP of the refrigerant. In this case, control apparatus 57 calculates target value TT of the gas cooler outlet temperature with the aforementioned equation 1, and controls the fan rotation speed of gas cooler fan 31 so that the gas cooler outlet temperature approaches target value TT. Control apparatus 57 also regulates the opening of electric expansion valve 33 so that high pressure-side pressure HP reaches subject value SP. This makes it possible to maintain the supercritical cycle.

Figure 3:
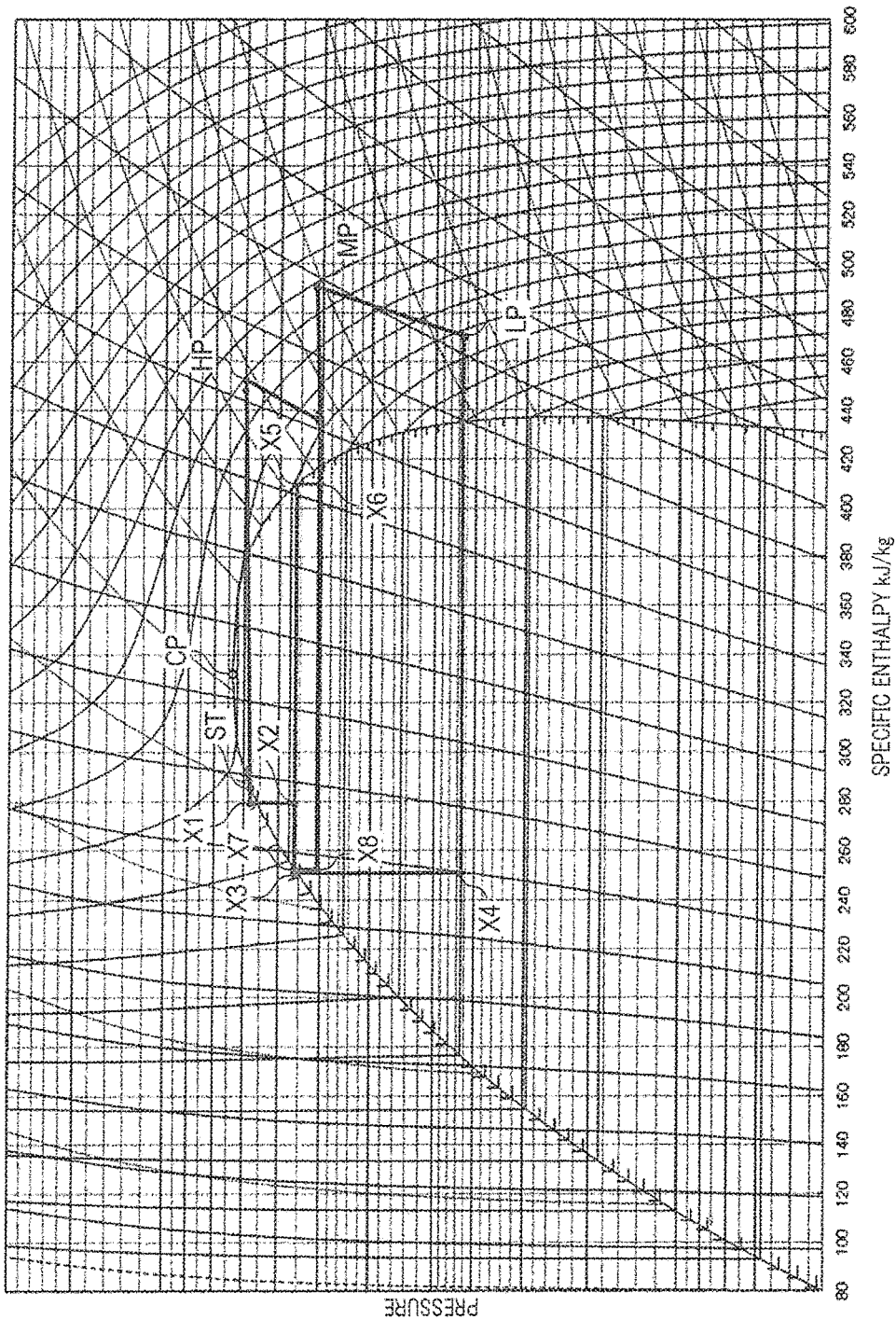
FIG. 3 is a P-H chart plotting the state of refrigeration apparatus R during cold storage operation under the environment of the middle-temperature period.
Figure 4:
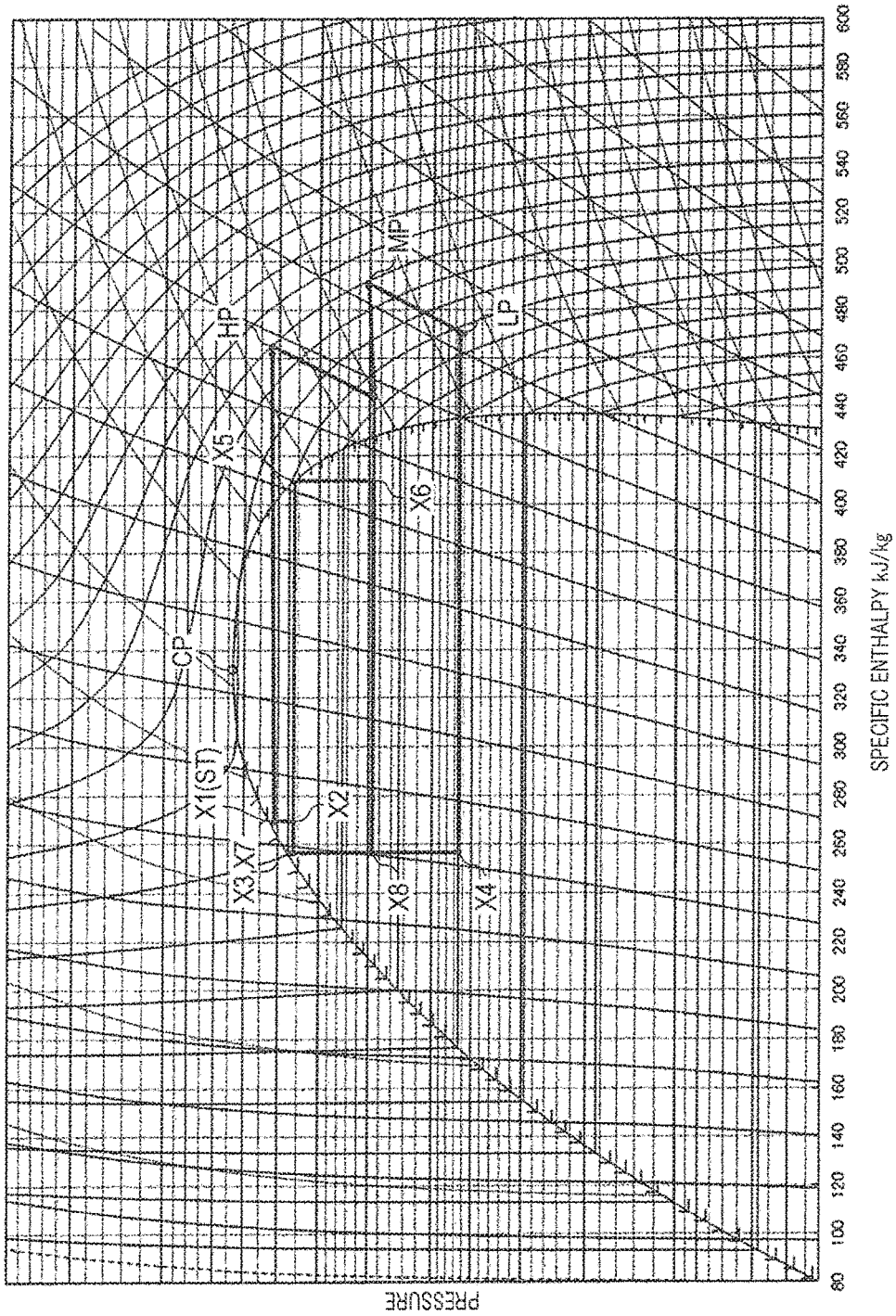
FIG. 4 is a P-H chart plotting the state of refrigeration apparatus R during cold storage operation under the environment of the low-temperature period.

FIG. 3 is a P-H chart plotting the state of refrigeration apparatus R during cold storage operation under the environment of a middle-temperature period with the outside air temperature being about 20 degrees Centigrade. FIG. 4 is a P-H chart plotting the state of refrigeration apparatus R during cold strobe operation under the environment of a low-temperature period with the outside air temperature being about 10 degrees Centigrade. In FIGS. 3 and 4, high pressure-side pressure HP becomes smaller than critical pressure CP of the refrigerant. In this case, control apparatus 57 prestores a data table indicating the relation between the pressure and the saturation temperature, and obtains saturation temperature ST of the saturated liquid with high pressure-side pressure HP, based on high pressure-side pressure HP detected by high-pressure sensor 49 with reference to the data table. Control apparatus 57 may calculate saturation temperature ST of the saturated liquid with a calculation equation.

Control apparatus 57 then calculates target value TT of the gas cooler outlet temperature with the aforementioned equation 2, and controls the fan rotation speed of gas cooler fan 31 so that the gas cooler outlet temperature approaches target value TT. Control apparatus 57 also regulates the opening of electric expansion valve 33 so that high pressure-side pressure HP reaches subject value SP. This makes it possible to maintain the saturation cycle.

Figure 5:
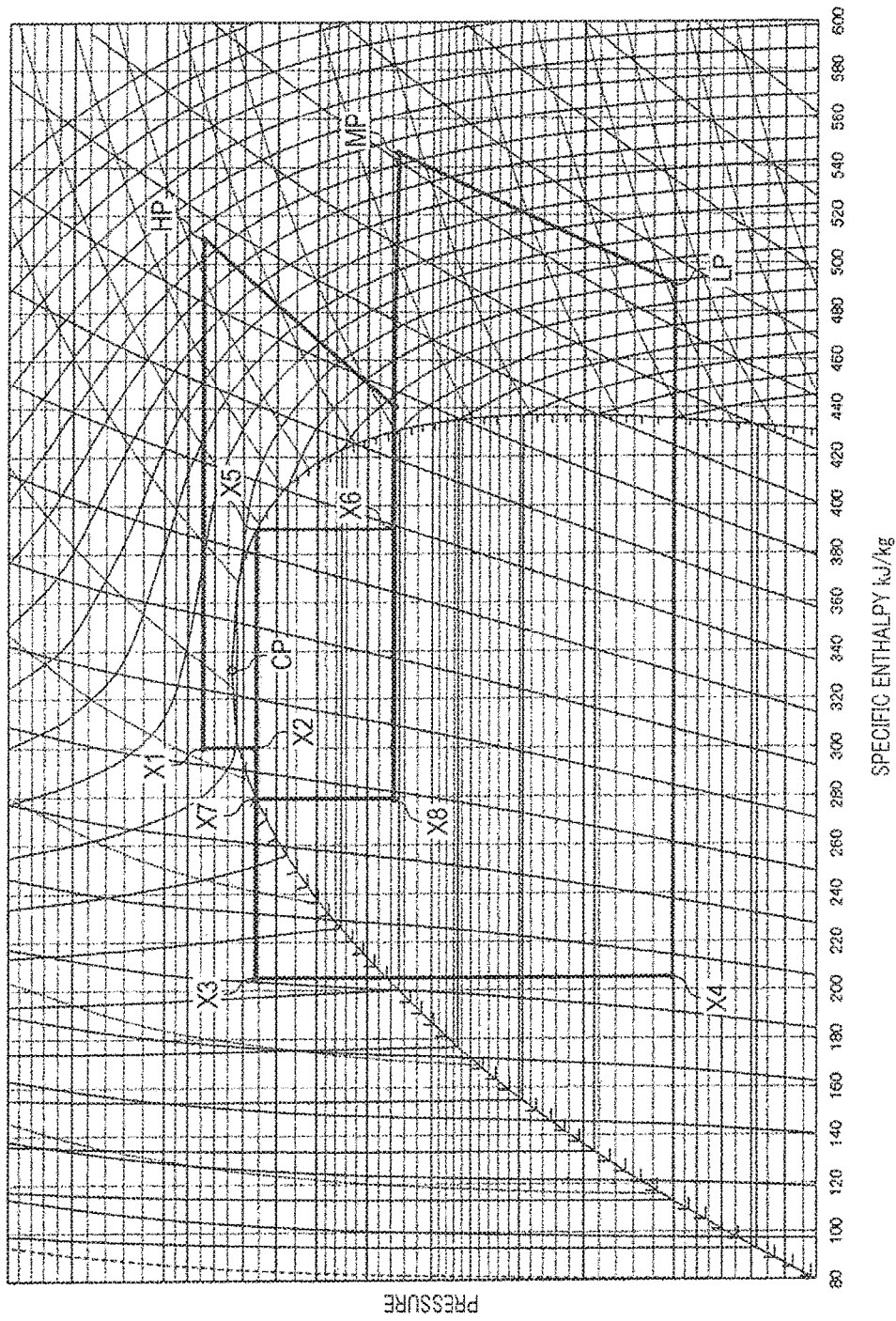
FIG. 5 is a P-H chart plotting the state of refrigeration apparatus R during refrigeration operation under the environment of a high-temperature period.

The same effect can be obtained when refrigeration apparatus R performs refrigeration operation. FIG. 5 is a P-H chart plotting the state of refrigeration apparatus R during refrigeration operation under the environment of the high-temperature period. Also in FIG. 5, high pressure-side pressure HP becomes larger than critical pressure CP of the refrigerant. In this case, control apparatus 57 calculates target value TT of the gas cooler outlet temperature with the equation 1 stated above, and controls the fan rotation speed of gas cooler fan 31 so that the gas cooler outlet temperature approaches target value TT. Control apparatus 57 also regulates the opening of electric expansion valve 33 so that high pressure-side pressure HP reaches subject value SP. This makes it possible to maintain the supercritical cycle.

Figure 6:
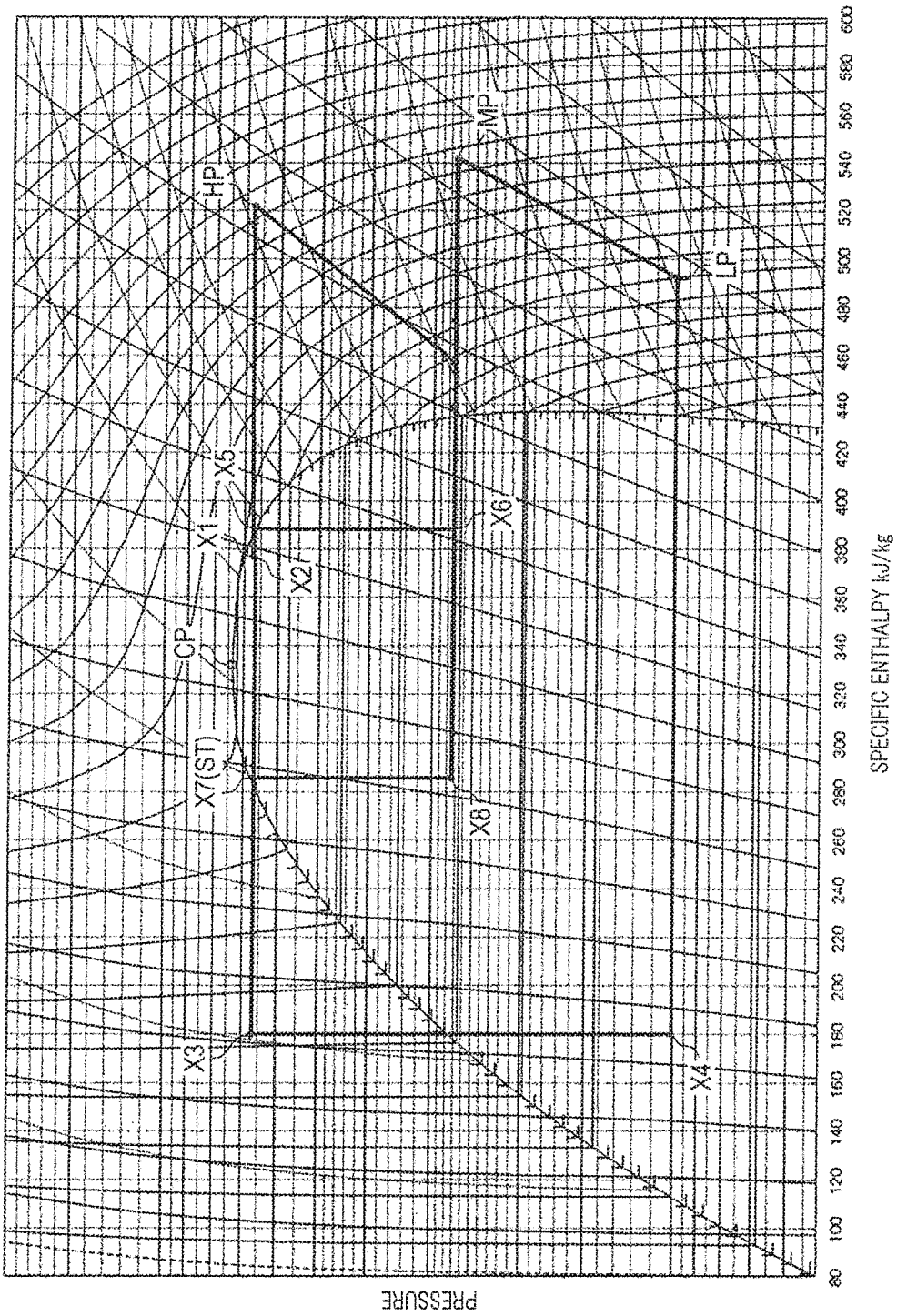
FIG. 6 is a P-H chart plotting the state of refrigeration apparatus R during refrigeration operation under the environment of a middle-temperature period.
Figure 7:
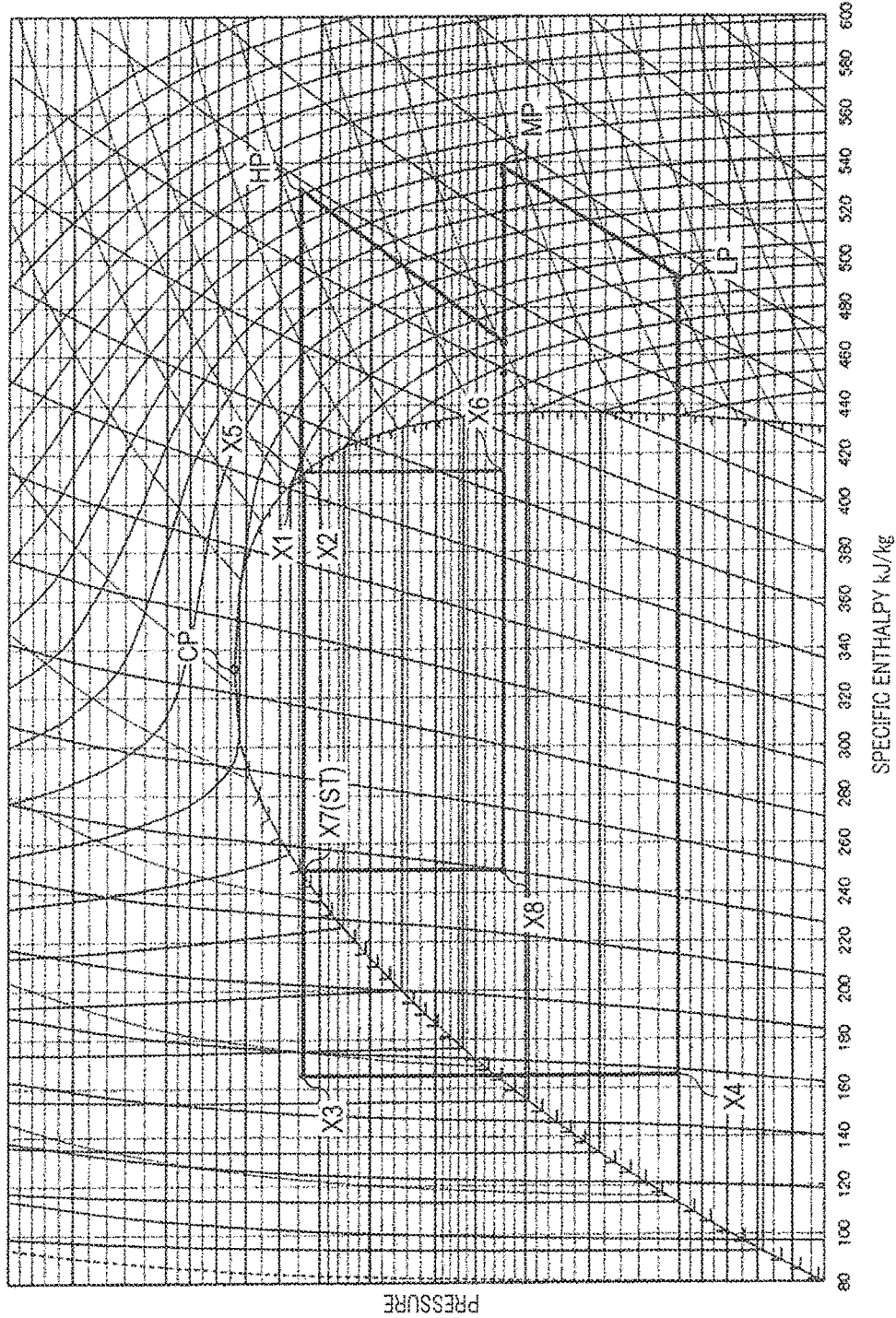
FIG. 7 is a P-H chart plotting the state of refrigeration apparatus R during refrigeration operation under the environment of a low-temperature period.

FIG. 6 is a P-H chart plotting the state of refrigeration apparatus R during refrigeration operation under the environment of the middle-temperature period. FIG. 7 is a P-H chart plotting the state of refrigeration apparatus R during refrigeration operation under the environment of the low-temperature period. In FIGS. 6 and 7, high pressure-side pressure HP becomes smaller than critical pressure CP of the refrigerant. In this case, control apparatus 57 prestores a data table indicating the relation between the pressure and the saturation temperature, and obtains saturation temperature ST of the saturated liquid with high pressure-side pressure HP based on high pressure-side pressure HP detected by high-pressure sensor 49 with reference to the data table.

Control apparatus 57 then calculates target value TT of the gas cooler outlet temperature with the aforementioned equation 2, and controls the fan rotation speed of gas cooler fan 31 so that the gas cooler outlet temperature approaches target value TT. Control apparatus 57 also regulates the opening of electric expansion valve 33 so that high pressure-side pressure HP reaches subject value SP. This makes it possible to maintain the saturation cycle.

As described in the foregoing, control apparatus 57 can execute control suitable for each of the cases where high pressure-side pressure HP is larger than critical pressure CP of the refrigerant and where high pressure-side pressure HP becomes less than critical pressure CP of the refrigerant. It is also possible to prevent unnecessary increase in rotation speed of the fan and to reduce noise caused by rotation of the fan.

(2-6) Function of Internal Heat Exchanger 15

A description is now given of control on solenoid valve 50 by control apparatus 57. As described in the foregoing, in internal heat exchanger 15, low-temperature refrigerant discharged from evaporator 41 and flowing through second flow channel 15B can cool the refrigerant flowing into main throttle section 39 through first flow channel 15A. Accordingly, specific enthalpy at the inlet of evaporator 41 can be made still smaller, and much more effective enhancement in the refrigeration performance can be achieved.

In the environment of high-outside air temperature that is higher than the outside air temperature illustrated in FIG. 5 in particular, pressure difference between tank internal-pressure TIP (pressure in X2 in FIG. 5) of tank 36, which is regulated to be subject value SP by electric expansion valve 43, and the middle pressure (MP) of middle-pressure suction pipe 26 extending to compressor 11 comes to disappear. In such a case, the opening of electric expansion valve 43 increments as described before, which may lead to the situation where, depending on circumstances, the refrigerant of main circuit 38 flowing through second flow channel 29B can hardly be supercooled with the refrigerant of auxiliary circuit 48 flowing through first flow channel 29A in split heat exchanger 29.

In such a case, the refrigerant flowing into electric expansion valve 39 is supercooled in internal heat exchanger 15 with the low-temperature refrigerant coming out of evaporator 41. As a result, it is possible to supply the refrigerant, which is in a liquid-rich liquid-filled state, to electric expansion valve 39, so that improvement in refrigeration performance can be achieved even in such circumstances.

(2-7) Control on Solenoid Valve 50

In such occasions as pull-down time of refrigeration apparatus R, the refrigerant coming out of evaporator 41 may be higher in temperature than the refrigerant flowing into electric expansion valve 39. Accordingly, control apparatus 57 executes control to open solenoid valve 50 when temperature OT of the refrigerant coming out of second flow channel 15B of internal heat exchanger 15 is equal to or more than temperature IT of the refrigerant flowing into first flow channel 15A of internal heat exchanger 15, temperature OT being detected by unit inlet temperature sensor 56, temperature IT being detected by unit outlet temperature sensor 54. When temperature OT is smaller than temperature IT, control apparatus 57 executes control to close solenoid valve 50.

As a consequence, when temperature OT is equal to or more than temperature IT, the refrigerant bypasses first flow channel 15A of internal heat exchanger 15, flows through bypass line 45, and flows into electric expansion valve 39. This makes it possible to prevent in advance the inconvenience that the refrigerant flowing into electric expansion valve 39 is adversely heated with the refrigerant coming out of evaporator 41.

Although bypass circuit 45 is connected in parallel with first flow channel 15A of internal heat exchanger 15 in the present embodiment, the bypass circuit and the solenoid valve may be provided in parallel with second flow channel 15B instead.

(3) Another Configuration of Refrigeration Apparatus R

Figure 8:
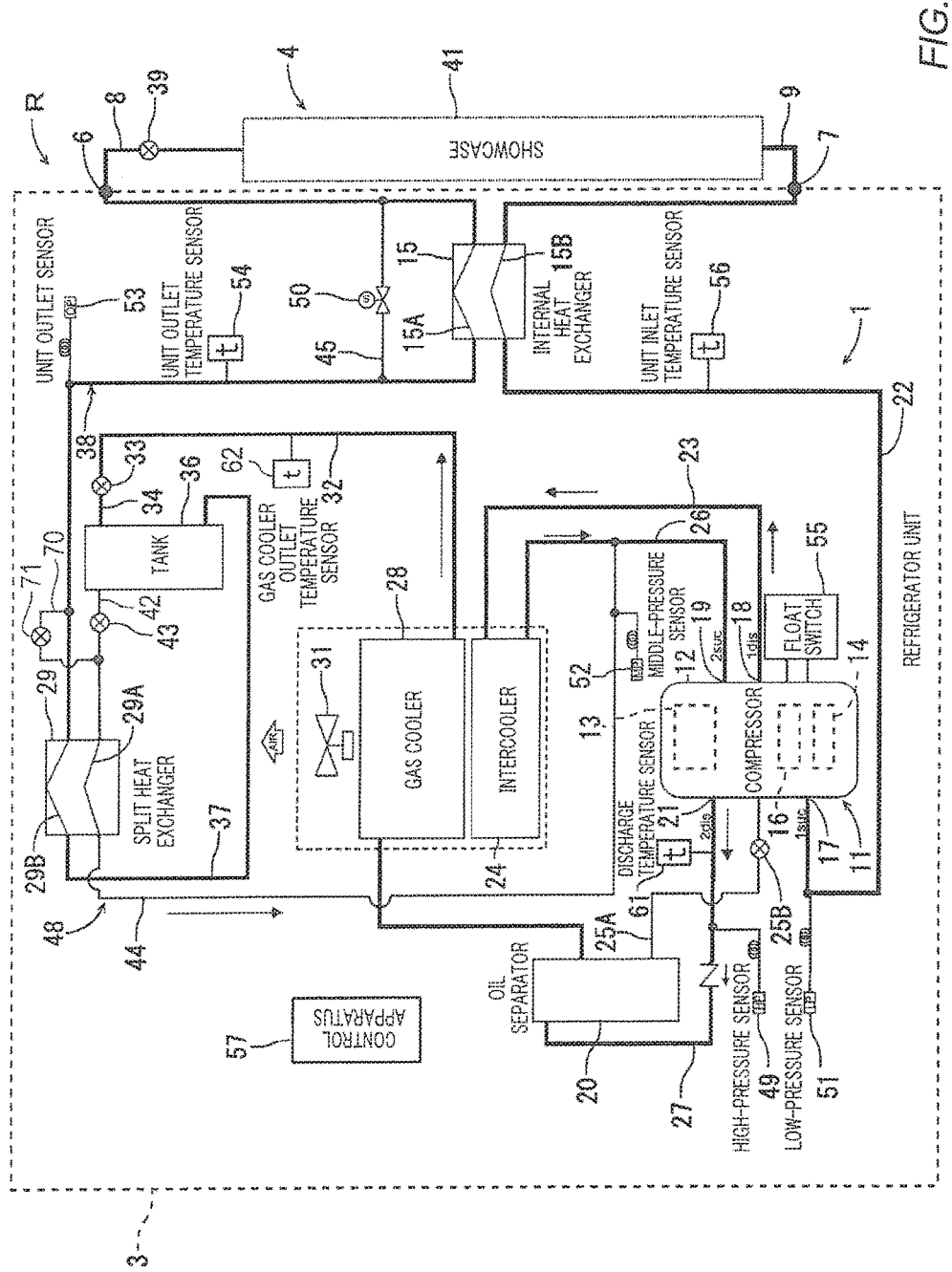
FIG. 8 illustrates a refrigerant circuit of refrigeration apparatus R different in configuration from that of FIG. 1.

Although the configuration of refrigeration apparatus R illustrated in FIG. 1 has been described in the present embodiment, the configuration of refrigeration apparatus R is not limited to the configuration illustrated in FIG. 1. Here, another configuration of refrigeration apparatus R will be described. FIG. 8 illustrates a refrigerant circuit of refrigeration apparatus R different in configuration from that of FIG. 1.

Refrigeration apparatus R illustrated in FIG. 8 includes liquid pipe 70 and electric expansion valve 71 in place of liquid pipe 46 and electric expansion valve 47 in refrigeration apparatus R illustrated in FIG. 1. One end of liquid pipe 70 communicates with tank outlet pipe 37 on the downstream side of split heat exchanger 29, while the other end of liquid pipe 70 communicates with middle-pressure return pipe 44 on the downstream side of electric expansion valve 43. Electric expansion valve 71 that serves as a second auxiliary circuit throttle section is provided in the middle of liquid pipe 70.

In the case of the configuration illustrated in FIG. 8, electric expansion valve 43 (first auxiliary circuit throttle section) and electric expansion valve 71 (second auxiliary circuit throttle section) constitute an auxiliary throttle section in this application. Liquid pipe 70 allows the liquid refrigerant flowing out of a lower portion of tank 36 to flow into electric expansion valve 71. Middle-pressure return pipe 44, electric expansion valves 43 and 71, gas pipe 42, and liquid pipe 70 constitute auxiliary circuit 48 in the present invention.

In the present embodiment, internal heat exchanger 15 is provided, but internal heat exchanger 15 may be omitted. An oil cooler may be provided in oil passage 25A that returns the oil separated by oil separator 20 into airtight container 12 of compressor 11.

As described in the foregoing, in the present embodiment, refrigeration apparatus R that includes a refrigerant circuit composed of compression section 11, gas cooler 28, electric expansion valve 39, and evaporator 41 includes: electric expansion valve 33 connected to the refrigerant circuit that is on the downstream side of gas cooler 28 and is on the upstream side of electric expansion valve 39; tank 36 connected to the refrigerant circuit that is on the downstream of electric expansion valve 33 and is on the upstream side of electric expansion valve 39; split heat exchanger 29 provided in the refrigerant circuit that is on the downstream side of tank 36 and is on the upstream side of electric expansion valve 39; electric expansion valves 43, 47 and 71, electric expansion valve 43 regulating a pressure of the refrigerant flowing out of pipe 42 provided in a first height of tank 36, electric expansion valves 47 and 71 regulating the pressure of the refrigerant flowing out of pipes 46 and 37 provided in a position lower than the first height; auxiliary circuit 48 that allows the refrigerant to flow through first flow channel 29A of split heat exchanger 29 and then sucks the refrigerant into a middle pressure portion of compressor 11, the refrigerant having the pressure regulated with electric expansion valves 43, 47 and 71; main circuit 38 that allows the refrigerant flowing out of tank 36 to flow through second flow channel 29B of split heat exchanger 29 to exchange heat with the refrigerant flowing through first flow channel 29A and then allows the refrigerant to flow into electric expansion valve 39; and control apparatus 57 that regulates a gas cooler outlet temperature to be a specified target value, the gas cooler outlet temperature being a temperature of the refrigerant after the refrigerant flows out of gas cooler 28 but before flows into electric expansion valve 33, in which control apparatus 57 regulates the gas cooler outlet temperature based on outside air temperature when the outside air temperature is higher than a specified temperature, and regulates the gas cooler outlet temperature based on saturation temperature ST of saturated liquid of the refrigerant after the refrigerant flows out of compressor 11 but before flows into electric expansion valve 33, when the outside air temperature is lower than the specified temperature.

Accordingly, it is possible to appropriately regulate the fan rotation speed of gas cooler fan 31 so that refrigeration apparatus R can be operated more efficiently, while increase in the fan rotation speed of gas cooler fan 31 can be suppressed.

Refrigeration apparatus R further includes an outside air temperature sensor that detects the outside air temperature, and control apparatus 57 determines whether or not the outside air temperature detected by the outside air temperature sensor is higher than the specified temperature.

Refrigeration apparatus R further includes high-pressure sensor 49 that detects high pressure-side pressure HP that is a pressure of the refrigerant after the refrigerant flows out of compressor 11 but before flows into electric expansion valve 33, and control apparatus 57 determines whether or not the outside air temperature is higher than the specified temperature based on high pressure-side pressure HP detected by high-pressure sensor 49.

Accordingly, it is possible to easily determine whether or not high pressure-side pressure HP is larger than critical pressure CP of the refrigerant based on high pressure-side pressure HP, and to regulate the gas cooler outlet temperature.

While the embodiment of the present invention has been described in the foregoing, the present invention is not limited to the aforementioned embodiment and various modifications are possible without departing from the meaning of the present invention.

The present invention is suitable for use in a refrigeration apparatus that includes a refrigerant circuit composed of a compression section, a gas cooler, a main throttle section, and an evaporator.

REFERENCE SIGNS LIST

R Refrigeration apparatus
1 Refrigerant circuit
3 Refrigerator unit
4 Showcase
8, 9 Refrigerant pipe
11 Compressor
15 Internal heat exchanger
15A First flow channel
15B Second flow channel
22 Refrigerant introduction pipe
26 Middle-pressure suction pipe
28 Gas cooler
29 Split heat exchanger
29A First flow channel
29B Second flow channel
31 Gas cooler fan
32 Gas cooler outlet pipe
33 Electric expansion valve (pressure-regulation throttle section)
36 Tank
37 Tank outlet pipe
38 Main circuit
39 Electric expansion valve (main throttle section)
41 Evaporator
42 Gas pipe
43 Electric expansion valve (first auxiliary circuit throttle section)
44 Middle-pressure return pipe
45 Bypass circuit
46, 70 Liquid pipe
47, 71 Electric expansion valve (second auxiliary circuit throttle section)
48 Auxiliary circuit
50 Solenoid valve (Valve apparatus)
57 Control apparatus (control section)
62 Gas cooler outlet temperature sensor

The invention claimed is:

1. A refrigeration apparatus that includes a refrigerant circuit composed of a compression section, a gas cooler, a main throttle section, and an evaporator, the refrigeration apparatus comprising:
a pressure-regulation throttle section connected to the refrigerant circuit that is on a downstream side of the gas cooler and is on an upstream side of the main throttle section;
a tank connected to the refrigerant circuit that is on a downstream of the pressure-regulation throttle section and is on the upstream side of the main throttle section;
a split heat exchanger provided in the refrigerant circuit that is on a downstream side of the tank and is on the upstream side of the main throttle section;
a first auxiliary throttle section and a second auxiliary throttle section, the first auxiliary throttle section regulating a pressure of the refrigerant flowing out of a first pipe provided in a first height of the tank, the second auxiliary throttle section regulating the pressure of the refrigerant flowing out of a second pipe provided in a position lower than the first height;
an auxiliary circuit that allows the refrigerant from the first pipe and the second pipe to flow through a first flow channel of the split heat exchanger and then allows the refrigerant to be sucked to a middle-pressure portion of the compression section, the refrigerant having the pressure regulated by the first auxiliary throttle section and the second auxiliary throttle section;
a main circuit that allows the refrigerant flowing out of the tank to flow through a second flow channel of the split heat exchanger to exchange heat with the refrigerant flowing through the first flow channel and then allows the refrigerant to flow into the main throttle section; and
a control section that regulates a gas cooler outlet temperature to be a specified target value, the gas cooler outlet temperature being a temperature of the refrigerant after the refrigerant flows out of the gas cooler but before flows into the pressure-regulation throttle section, wherein
the control section regulates the gas cooler outlet temperature based on outside air temperature when the outside air temperature is higher than a specified temperature, and regulates the gas cooler outlet temperature based on saturation temperature of saturated liquid of the refrigerant after the refrigerant flows out of the compression section but before flows into the pressure-regulation throttle section, when the outside air temperature is lower than the specified temperature.

2. The refrigeration apparatus according to claim 1, further comprising:
an outside air temperature sensor that detects the outside air temperature, wherein
the control section determines whether or not the outside air temperature detected by the outside air temperature sensor is higher than the specified temperature.

3. The refrigeration apparatus according to claim 1, further comprising:
a pressure sensor that detects a high pressure-side pressure that is a pressure of the refrigerant after the refrigerant flows out of the compression section but before flows into the pressure-regulation throttle section, wherein
the control section determines whether or not the outside air temperature is higher than the specified temperature based on the high pressure-side pressure detected by the pressure sensor.

* * * * *